(12) United States Patent
Rich

(10) Patent No.: US 7,111,582 B2
(45) Date of Patent: Sep. 26, 2006

(54) PORT ATTACHMENT SYSTEM FOR BIRD FEEDERS AND THE LIKE

(75) Inventor: Christopher T. Rich, Lancaster, PA (US)

(73) Assignee: Woodstream Corporation, Lititz, PA (US)

( * ) Notice: Subject to any disclaimer, the term of this patent is extended or adjusted under 35 U.S.C. 154(b) by 0 days.

(21) Appl. No.: 10/855,444

(22) Filed: May 28, 2004

(65) Prior Publication Data

US 2005/0263085 A1    Dec. 1, 2005

(51) Int. Cl.
*A01K 39/01* (2006.01)
(52) U.S. Cl. .................................................. 119/57.8
(58) Field of Classification Search ............... 119/52.2, 119/52.3, 57.8, 57.9; 248/219.1, 222.11, 248/224.7, 229.1, 230.1, 689
See application file for complete search history.

(56) References Cited

U.S. PATENT DOCUMENTS 4,136,924 A * 1/1979 Dobrosielski et al. ...... 439/801
4,318,364 A * 3/1982 Bescherer .................. 119/57.8
5,215,039 A * 6/1993 Bescherer .................. 119/57.8
6,378,458 B1 * 4/2002 Boyd ......................... 119/52.3
6,546,894 B1   4/2003 Chrisco et al. ............. 119/52.2
D490,941 S    6/2004 Rich et al. ................. D30/124

* cited by examiner

*Primary Examiner*—Robert P. Swiatek
(74) *Attorney, Agent, or Firm*—Jacobson Holman PLLC

(57) ABSTRACT

A port assembly for mounting within an opening of a mounting structure, such as a feed port assembly for mounting within a bird feeder opening. The port assembly includes a feed port having a port plate with a port opening therethrough aligned with the housing opening to enable access to the bird feed within the housing. The port plate includes a flange engageable with the housing wall. Disposed within the interior of the housing is an anchor having a pair of clamping feet in engagement with the inwardly facing housing wall whereby the anchor is movable with respect to the feed port to clamp the wall between the feed port flange and the clamping feet of the anchor.

20 Claims, 5 Drawing Sheets

PORT ATTACHMENT SYSTEM FOR BIRD FEEDERS AND THE LIKE

BACKGROUND OF THE INVENTION

1. Field of the Invention

This invention generally relates to a port assembly for mounting within an opening of a mounting structure, such as bird feeders. More specifically, the present invention relates to a bird feed port assembly for mounting to a bird feed containment housing through feed openings in the wall of the housing. The feed port assembly has particular utility for bird feed containment housings of multiple chambers wherein each chamber has a separate feed port assembly which can be mounted in the chamber wall at a location independent of the locations of the feed port assemblies of adjacent chambers.

2. Description of the Related Art

Commercially available bird feeders come in a great variety of configurations. These feeders generally include a housing for retaining the bird feed with a plurality of openings within the housing to provide access to the bird feed within the housing interior. One such bird feed assembly includes a cylindrical hopper having spiral or helical walls that extend substantially vertically from the top to the bottom of the hopper to define a plurality of distinct chambers to retain different types of bird feed. Each chamber is isolated from adjacent chambers. Such a bird feeder having a cylindrical hopper or tube is shown in commonly-assigned U.S. patent application Ser. No. 10/823,766, entitled "Bird Feeder" filed on Apr. 14, 2004 (hereinafter "the '766 application"), based on provisional patent application Ser. No. 60/462,297, filed on Apr. 14, 2003. A spiral or helical bird feed dispenser is also the subject of commonly assigned design patent application Ser. No. 29/181,047 filed May 5, 2003, now U.S. Pat. No. D490,941 issued Jun. 1, 2004. Each of these applications are incorporated by reference as if fully set forth herein.

The '766 application discloses a cylindrical hopper with spiral or helical partitions to provide a multiplicity of compartments that provide the bird feed at a lower extremity through a coupler element. The patent application also recognizes that multiple vertically-spaced feed openings can be provided intermediate the top and bottom of the hopper shell to communicate with the individual compartments.

Vertically-oriented bird feeders are generally known in the art and include a plurality of holes or openings in the housing wall with a bird feed port assembly, including a combined perch and flap which engages the housing wall. An internally-oriented deflector extends into the housing interior to cover or shield the port opening to prevent gravitational discharge of feed through the opening, yet permit birds to access the seed by reaching into the holes or opening. See, U.S. Pat. No. 6,546,894 issued Apr. 15, 2003. In such patent, the port assembly appears to be affixed to the housing by some sort of snap-in configuration. However, snap-in port attachment systems are not very robust or secure.

Secure systems for attaching bird feed port assemblies to a housing are known. The feed port assemblies are known to be attached in opposing pairs so that the diametrically opposed pairs are fastened together and move in a direction toward each other, during tightening, to retain the port assemblies to an outwardly-directed housing surface. Such assemblies are not satisfactory when multiple chambers within a cylindrical housing are employed because the diametrically-opposed configuration cannot be utilized, at least in any reasonable cost effective manner. Thus, a need has arisen for a robust and secure port attachment system, particularly for a multiple compartment bird feeder or other mounting structure, wherein each port is independently and separately mounted to a mounting surface.

SUMMARY OF THE INVENTION

In order to overcome the deficiencies of the prior art, the bird feed port assembly of the present invention is self-supporting and includes a feed port having a front or port plate with an opening therethrough for alignment with an opening in the feeder housing wall to access bird feed in the housing. A partially cylindrical extension member or roof integral with the port plate extends into the interior of the housing through a generally circular opening in the housing to shield movement of bird seed out of the port opening. The port plate forms a flange around the port opening which is shaped to fit flush to the outside surface of the housing around the housing opening, and a back anchor support or mounting plate is positioned at the rear of the extension member.

The port plate includes a perch extending outwardly from its front surface so that a bird may stand upon the perch and eat the bird seed within the housing through the port opening. The feed port, including the port plate, the extension member, the mounting plate, and the perch, are all molded or formed as one piece, preferably molded of a suitable metal, such as aluminum or the like.

A U-shaped anchor or clamp, preferably made of plastic, is positioned inside the housing and has it yoke adapted to be adjustably attached behind the mounting plate. The legs of the U-shaped anchor extend around the sides of the extension member and terminate in clamping feet which engage the housing wall on opposite sides of the housing opening behind the port plate flange. The U-shaped anchor is preferably attached to the mounting plate by a threaded or self-tapping screw or bolt whose head is on the inside of the mounting plate, accessible through the port opening, and its shank extends through a hole in the mounting plate for threaded engagement in a threaded hole in the anchor yoke.

By tightening the screw or bolt through the port plate opening, the U-shaped anchor is brought forward so that the opposed clamp feet are forced against the inside of the housing wall. This action causes the housing wall to be clamped between the clamp feet and the opposed inner surfaces of the port plate flange, thus causing the port assembly to be self-supported on the housing wall in the housing opening.

An object of the present invention is to provide a secure attachment mechanism for a port assembly, particularly a feed port assembly for a bird feeder.

Another object of the present invention is to provide a bird feeder port assembly for use with cylindrical bird feeder housings with separate compartments that are functionally separate from adjacent compartments.

It is a further object of the present invention to provide a port assembly for a bird feeder where the port assembly is affixed to the housing wall adjacent a wall opening in a secure and self-supporting manner, but without requiring any additional mounting holes or fasteners in the housing wall.

Still further, it is an object of the present invention to provide a bird feeder port assembly for mounting to a housing wall and where the housing wall is tightly clamped or gripped by the bird feeder assembly to retain the assembly thereon in a self-supporting manner.

Yet another object of this invention to be specifically enumerated herein is to provide a bird feeder port assembly in accordance with the preceding objects which will conform to conventional forms of manufacture, be of simple construction and easy to use so as to provide a bird feeder port assembly that will be economically feasible, strong and long lasting and relatively trouble free in installation and use.

Other and further objects, features, and advantages of the invention will become apparent from the ensuing description and claims taken in conjunction with the attached drawings.

BRIEF DESCRIPTION OF THE DRAWINGS

These and other objects, features and many of the attendant advantages of this invention will be better understood by those with ordinary skill in the art in connection with the following detailed description of the preferred embodiments and the accompanying drawings wherein.

Like reference characters refer to like parts throughout the several views of the drawings.

DESCRIPTION OF THE PREFERRED EMBODIMENTS

Figure 1:
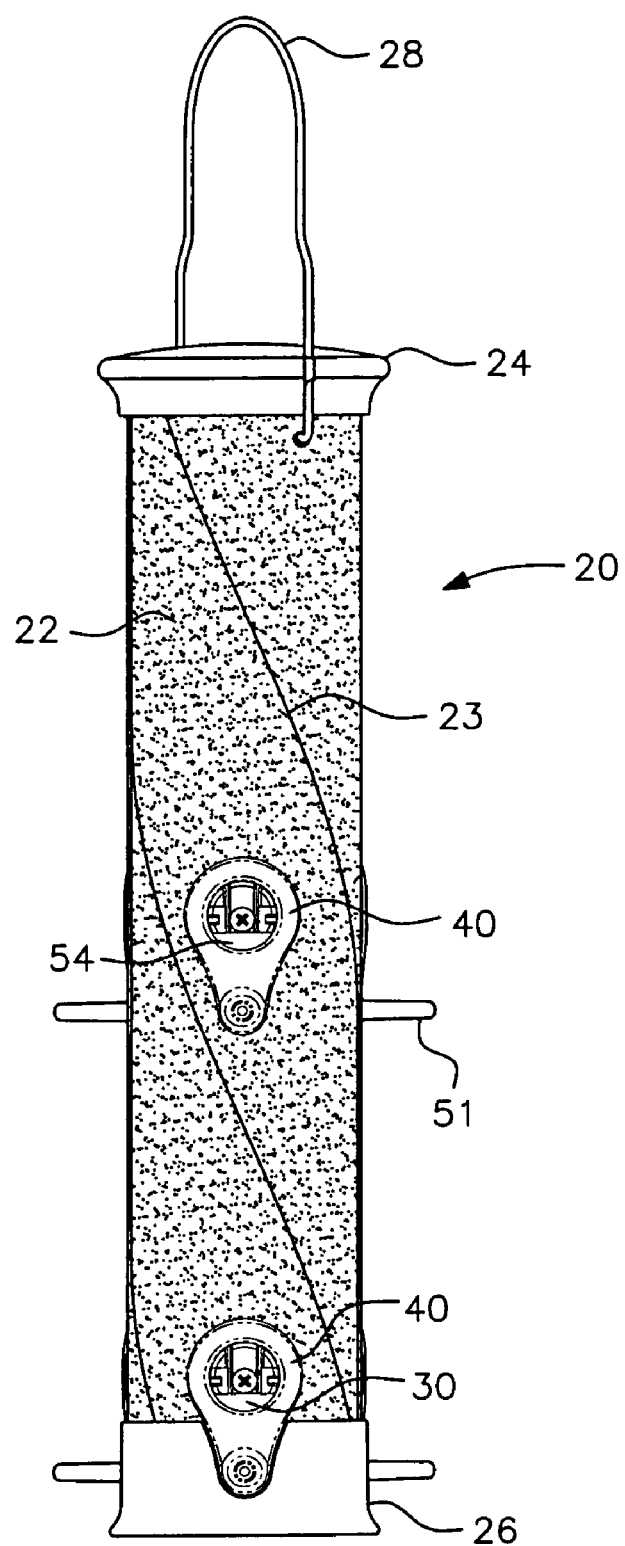
FIG. 1 is a front view of a bird feeder with bird feeding port assemblies affixed thereto.
Figure 2:
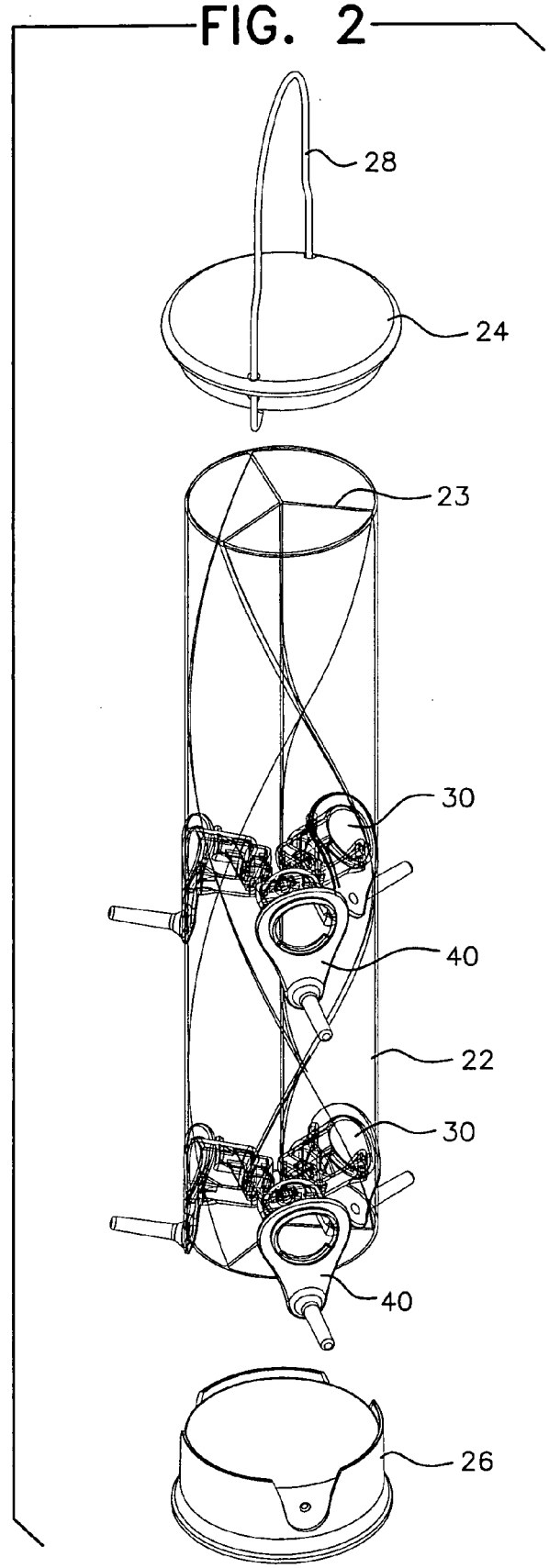
FIG. 2 is an exploded perspective view of a bird feeder with feed port assembly.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring now to the drawings, a preferred embodiment of a bird feeder is designated generally by the reference numeral 20 and includes a main bird feed containment housing 22 comprising a tubular, i.e., cylindrical, hopper or housing having integrally-extruded spiral or helical divider walls 23 internally of the cylindrical housing 22. The cylindrical housing 22 is preferably formed of translucent or transparent plastic so that the dividers and the bird feed contained within the housing compartments are visible. The housing wall can also be mottled and each wall segment can be of different color. The helical walls 23 divide the housing 22 into three separate housing compartments, each of which are completely isolated from each other. Desirably, different bird seed or feed can be inserted in each of the separate housing compartments. The bird feed containment housing 22 includes top and bottom caps or covers 24, 26 which can be secured to the cylindrical housing 22 in any convenient manner, along with a hanger 28 through the top cap 24 for attachment to a hook or other supporting member.

Plural holes 30, preferably circular, are provided in the housing wall 22, in each of the separate housing compartments (three compartments are shown in the embodiment depicted), and the novel feed port assembly of the present invention, generally designated by reference numeral 40, is secured to the housing 22 through the housing holes 30, in a manner to be described.

Each feed port assembly 40 includes three components: a feed port generally designated by reference numeral 50, a U-shaped anchor or clamp generally designated by reference numeral 60, and a screw 70 or other attachment means for connecting the anchor 60 to the port 50 and for securing the assembly 40 to the housing wall 23, as will be described. The feed port 50 includes a port plate 52 with a port opening 54 therethrough for alignment with the housing opening 30 to enable access to the bird feed (not shown) within the housing 22. The port plate 52 is contoured to conform with the contour of the housing 22 and includes a flange 56 engageable with an outwardly-directed housing wall 25. Integral with and extending from the flange interior surface is an extension member or roof 57 intended to extend through the opening 30 into the interior 27 of the housing to provide a shield to reduce or deflect the downward forces or movement of the bird seed to prevent the seed from exiting the port opening 54. The roof 57 is preferably of cylindrical contour to conform to the shape of the opening 30 and extends less than 180° around the circumference of the port opening 54. The exact angular extent is not critical, but is preferably about 150°. However, the angular extent of the extension or roof 57 cooperates with the legs 61, 63 of anchor or clamp 60, to be described hereinafter, to define a shed 100 sufficient to prevent bird seed from flowing out of the port opening 54 but allow the bird seed to buildup around the sides of the opening 54.

Attached at the back of, and generally perpendicular to, the roof 57 is a back anchor support or mounting plate 58 having an extension 53 which extends below the side edges 96 of roof 57. The anchor support plate 58 also includes gussets 98 to rigidify the plate 58 and its extension 53 onto the back of roof 57. A mounting hole 59 extends through extension 53 for freely receiving the shank 72 of screw 70, as will be described. The anchor support/mounting plate 58 has a generally flat surface and also includes a lateral extension 55 that extends rearwardly above the mounting hole opening 59. It should be apparent that the extension member or roof 57 can have any cross-sectional shape compatible with the shape of the housing opening 30.

The port plate 52 includes a perch 51 extending from the front surface thereof so that a bird may stand upon the perch and consume the bird seed within the housing through the port opening 54. Preferably, the feed port 50, including the perch 51, the flange 56, the extension member or roof 57 and the anchor support plate 58, is integrally-formed from metallic material, although rigid plastics can be utilized. The anchor support plate 58 also includes a lateral extension or ledge 55 extending inwardly toward the housing center and is substantially perpendicular to the plane of the anchor support plate 58 for abutting against the anchor 60 to prevent anchor rotation when the anchor 60 and port 50 are screwed in a tightening direction, as will be described.

The port plate 52 includes an integral lip 102 extending from the periphery of the port opening 54 conforming generally to the contour of the holes 30 in the housing wall 22. Its angular extent about the periphery is preferably about 45°–55°. The lip 102 width, in the direction toward the interior of the housing, is substantially equal to the thickness of the housing wall, although it could extend further into the interior of the housing if desired. The lip 102 functions primarily as a positioning guide to locate or position the port assembly 40 to the housing wall 22.

Figure 3:
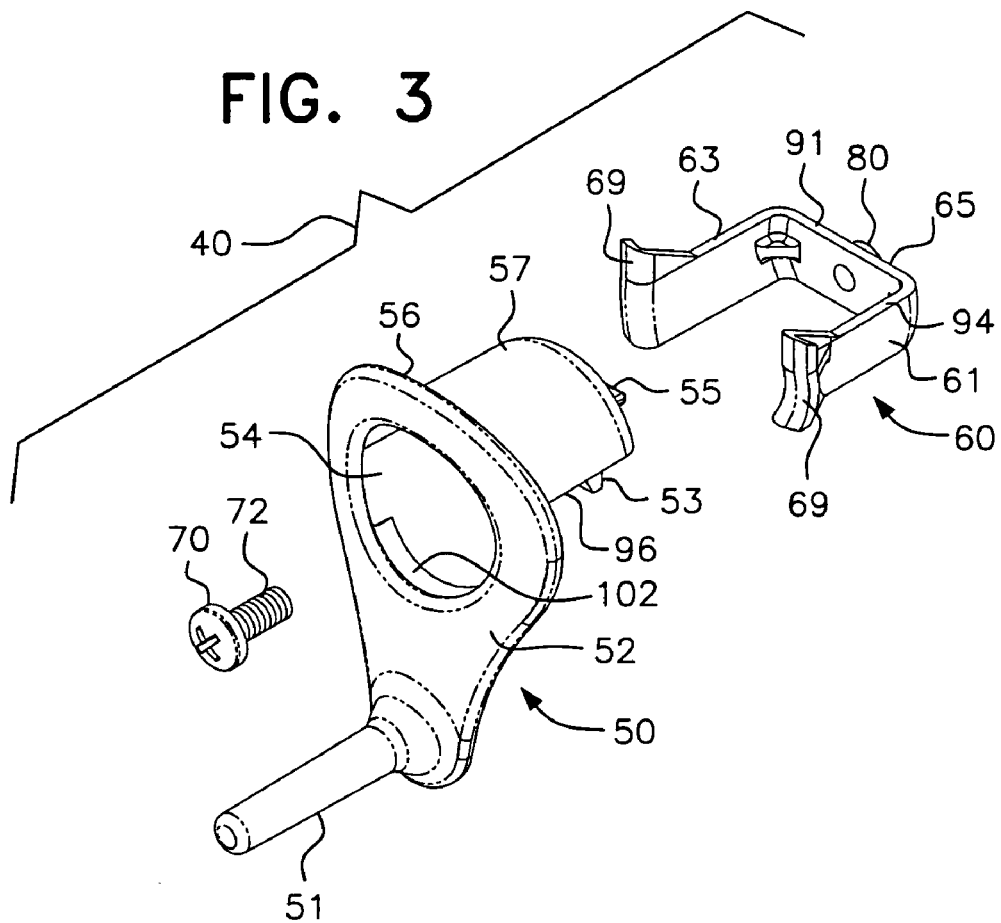
FIG. 3 is an exploded perspective view of the feed port assembly.
Figure 4:
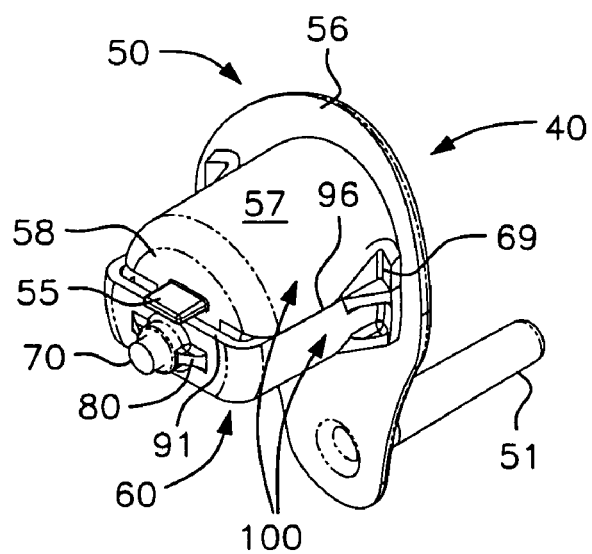
FIG. 4 is a rear perspective view of the feeding port assembly.
Figure 5:
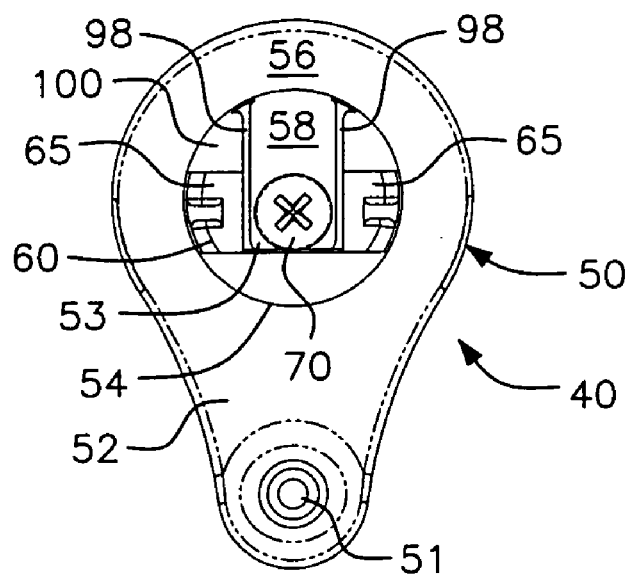
FIG. 5 is a front view of the feeding port assembly.
Figure 6:
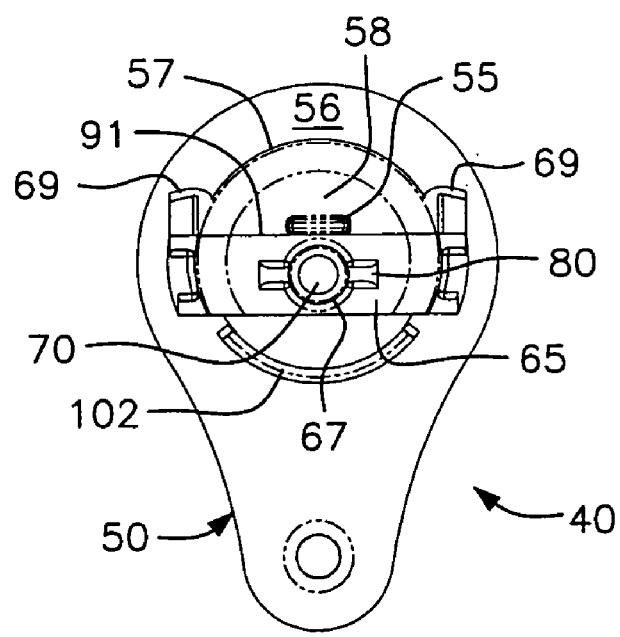
FIG. 6 is a rear view of the feeding port assembly.

Connected with the port 50 is an anchor or clamp 60. The anchor 60 is generally U-shaped, having a pair of substantially parallel legs 61, 63 joined by a substantially transverse yoke 65. The yoke 65 includes a threaded hole 67 for threadingly receiving and engaging the threads 72 of screw 70. At the free ends of each of the parallel legs 61, 63 is a clamping foot 69 for engaging the inwardly-facing wall surface 21 of the housing 22 50 that the housing wall is clamped between the clamping feet 69 of the anchor 60 and the flange 56 of the port 50. The anchor 60 is preferably of a plastic material where the legs 61, 63 are somewhat flexible, particularly near the juncture with the yoke 65 so that the legs can be compressed inward for insertion within the hole 30 of the housing 22, as will be described. The yoke 65 lies in engagement with the back surface of the anchor support plate 58 of the port 50, the top edge 94 of the legs 61, 63 underlies and engages the bottom side edges 96 of the roof 57, and the top edge 91 of the yoke 65 engages the ledge 55 (See, FIGS. 3, 4 and 6). The screw 70 is insertable freely through the hole 59 of the anchor support plate 58 and threadingly engages the threaded hole 67 of the anchor yoke 65 to thus retain the anchor 60 to the port 50.

The screw 70 is insertable freely through the hole 59 of the anchor support plate 58 and threadingly engages the threaded hole 67 of the anchor yoke 65 to thus retain the anchor 60 to the port 50. The back of the anchor yoke 65 around hole 67 preferably includes a raised portion 80 to reinforce the hole 67 and its engagement with threads 72 on screw 70. In an alternate embodiment, the threaded screw 70 could be self-tapping so that threaded hole 67 is first formed when the screw 70 is engaged with anchor yoke 65.

As assembled, the legs 61, 63 of the anchor 60 form a continuation of the side edges 96 of the extension member or roof 57 which forms a shed 100 in the interior of the housing 22 around the port opening 54. The shed 100 preferably extends about 200° to about 220° around the port opening 54 to block bird seed from flowing out of the port opening 54, but allowing bird seed to buildup around the sides of opening 54.

Figure 7:
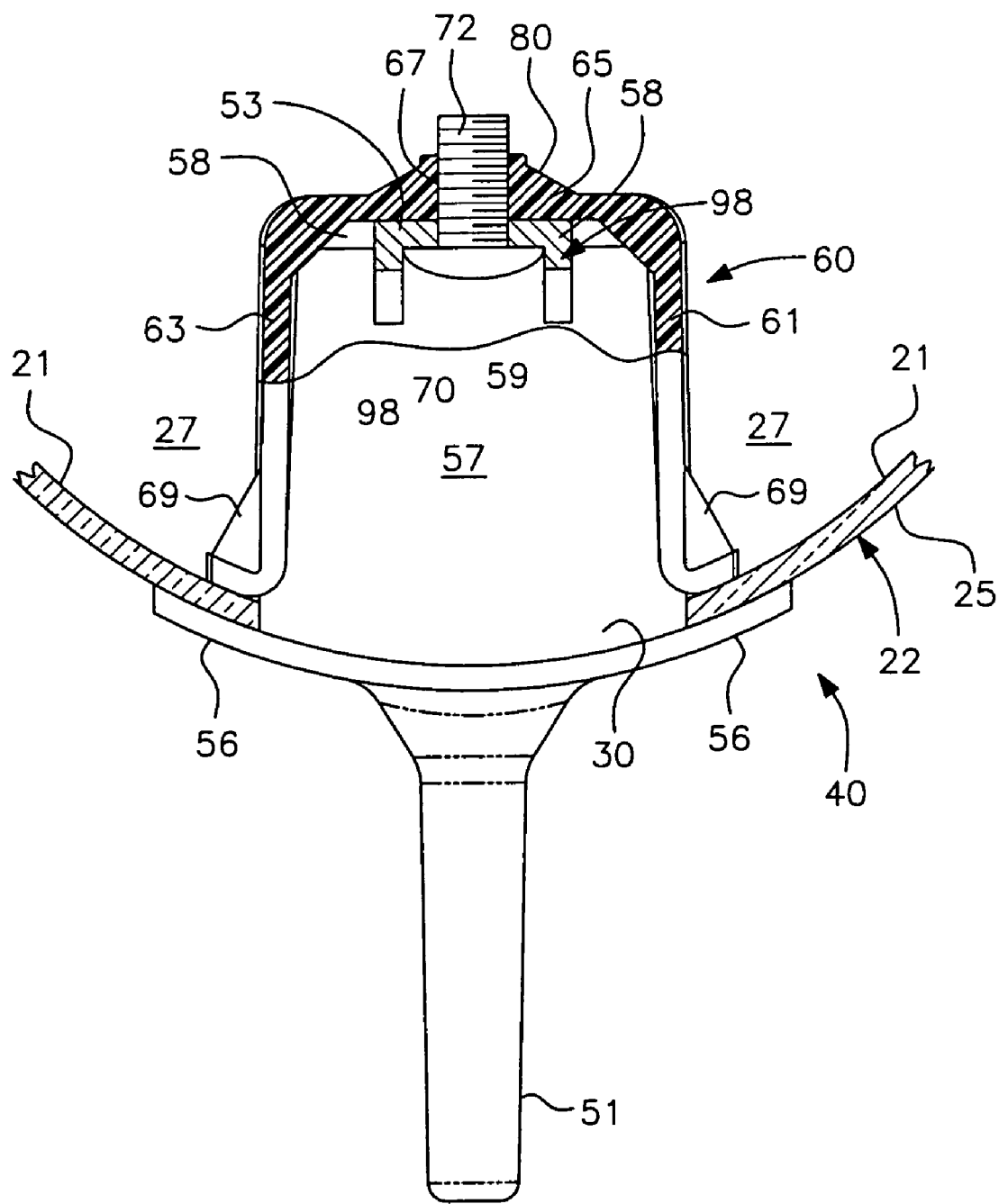
FIG. 7 is a bottom partial cross-section view of the feeding port assembly with the housing wall clamped therein.

To mount the port assembly 40 to the housing 22, the anchor is loosely connected with the port 50 by the screw attachment, as discussed above. This loose attachment enables the port assembly 40 to be inserted within the housing hole 30 from the exterior of the housing 22. The lip 102 will rest upon the edge of the hole 30. The anchor legs 61, 63 are flexible and are compressed so that they can flex into the hole 30 of the housing 22. After insertion, the legs 61, 63 of the anchor 60 and the clamping feet 69 are positioned on the outside of the hole 30 and facing the inner surface 21 of the housing 22, ready for the housing wall to be compressed between the flange 56 and the clamping feet 69. Compression occurs when the screw 70 is turned or tightened and the anchor 60 moves in a direction toward the port 50. That is, the screwing action pulls the plastic anchor 60 toward the inner wall 21 of the housing 22. The anchor 60 is not allowed to rotate and the ledge 55 also assists in preventing the rotation since it impedes any tendency of the anchor yoke 65 by reason of the positioning of the legs 61, 63 below the bottom side edges 96 of the roof 57, to be angularly displaced. The clamping action is attained as the screw 70 is rotated and the wall of the housing 22 is trapped between the flange 56 of the port 50 and the clamping feet 69 of the anchor. A bottom view of the assembled port assembly 40 is shown in FIG. 7 with the walls of the housing compressed between the anchor 60 and flange 56 of the port 50.

Although the embodiment depicted in the drawings utilizes a tubular or cylindrical housing as the bird feed containment housing, this shape is not required. The housing could take other shapes and the housing walls could be flat or planar. With such an embodiment, the flange of the port would similarly be flat or planar to provide a flush engagement of the flange to the exterior wall. Similarly, although the hole 30 in the housing is shown as round, this too can be altered to some other configuration. What is required is that the flange of the port overlie the clamping feet of the anchor with a wall portion therebetween to provide the clamping/retaining action. Similarly, the opening within the port could be square or rectangular, or another configuration. Indeed, this would result in an anti-rotational geometric relationship.

The present invention has application outside of bird feeders. That is, the port assembly can be used to mount other items to any mounting surface that defines an interior to receive the extension of the port. For example, the port assembly could be used for mounting recessed lighting, gauges, camera security systems in existing wall structures, and the like.

The foregoing descriptions and drawings should be considered as illustrative only of the principles of the invention. As noted, the invention may be configured in a variety of shapes and sizes and is not limited by the dimensions of the preferred embodiment. Othersimilar modifications to the disclosed embodiments can also be made within scope of the instant inventive concepts. Thus, the foregoing descriptions and drawings should be considered as illustrative only of the principles of the invention.

What is claimed is:

1. A bird feeder comprising:
    a bird feed containment housing having an outwardly facing and inwardly facing housing wall defining a housing interior and having at least one housing opening to receive a feed port assembly; and
    a feed port assembly including,
        a feed port having a port plate with a port opening therethrough aligned with said housing opening to enable access to bird feed within the housing, said port plate having a flange engageable with said outwardly facing housing wall, and an extension member integral with said flange extending through the housing opening into the housing interior; and
        an anchor in engagement with the inwardly facing housing wall, said anchor being movable with respect to said extension member and cooperating with said extension member to clamp the housing wall between the anchor and the port plate flange.

2. The bird feeder of claim 1 further comprising a fastening element for moving said anchor and said feed port with respect to each other to clamp the housing wall between the anchor and port plate flange.

3. The bird feeder of claim 2 wherein said fastening element includes a screw having a threaded shank extending freely through said extension member and threadingly engaged with said anchor, whereby turning of the screw moves the anchor in the direction of clamping.

4. The bird feeder of claim 2 wherein access to said fastening element is through said port opening.

5. The bird feeder of claim 1 wherein said extension member includes a roof extending substantially perpendicular to the port plate from the top of the port opening into the housing interior.

6. The bird feeder of claim 5 wherein said port opening is circular and said roof is semi-cylindrical and extends from the circular port opening.

7. The bird feeder of claim 1 wherein said extension member includes a portion for impeding bird feed within the housing from flowing out through the housing opening.

8. The bird feeder of claim 1 wherein said anchor is substantially U-shaped having a yoke connected with said extension member and a pair of parallel legs extending from the yoke, the free ends of the parallel legs terminating in clamping feet that engage the inwardly facing housing wall.

9. The bird feeder of claim 8 wherein said extension member includes a roof extending substantially perpendicular to the port plate from the top of the port opening into the housing interior, said pair of parallel legs engaging said roof wherein said roof and legs define a shed for impeding bird feed within the housing from flowing out of the housing opening.

10. The bird feeder of claim 1 wherein said housing is an elongated, vertically-oriented cylinder.

11. The bird feeder of claim 10 wherein said housing includes internal helical walls to divide the housing interior into separate compartments, each separate compartment including a housing opening and a feed port assembly.

12. A feed port assembly for a bird feeder having a housing for containing the bird feed, the housing having a housing wall defining outwardly facing and inwardly facing wall surfaces and at least one opening in the housing wall providing access to a housing interior, said feed port assembly comprising:
   a port including a flange surrounding a port opening and having a flange surface engageable with an outwardly facing wall surface of the housing;
   an anchor positioned in said housing interior and having clamping feet engageable with an inwardly facing wall surface of the housing; and
   a fastening element for removably connecting the anchor to said port, said port and said anchor being movable with respect to each other to clamp the port to the housing.

13. The feed port assembly of claim 12 further comprising an extension member extendable from said port through the housing wall opening into the housing interior.

14. The feed port assembly of claim 13 wherein said extension member includes a roof and an anchor support plate that extends substantially perpendicular from said roof.

15. The feed port assembly of claim 14 wherein said feet extend from said anchor support plate via a pair of legs that engage said roof, said roof, anchor support plate, and legs defining an enclosed shed.

16. The feed port assembly of claim 14 further comprising at least one grommet between said roof and said anchor support plate.

17. The feed port assembly of claim 12 wherein said anchor is plastic.

18. A bird feeder comprising:
   a feeder housing for containing bird feed, said housing including a feed containing wall having outwardly and inwardly oriented mounting surfaces and an opening therein;
   a port mounted adjacent said opening and having a port opening and a surrounding flange engageable with said outwardly oriented mounting surface of said housing wall, said port further including an anchor support surface positioned inside said housing;
   a substantially U-shaped anchor having a pair of substantially parallel legs and a transverse base, each leg including a clamping foot engageable with said inwardly oriented mounting surface of said housing wall; and
   a fastening element for connecting said anchor to said anchor support surface of said port and for moving said anchor and port with respect to each other to rigidly clamp the housing wall between the port flange and each clamping foot of the anchor.

19. The bird feeder of claim 18 wherein said housing is generally cylindrical.

20. The bird feeder of claim 18 wherein access to said fastening element is through said port opening.

* * * * *